(12) United States Patent
Ishikawa

(10) Patent No.: US 7,310,582 B2
(45) Date of Patent: Dec. 18, 2007

(54) ELECTROMAGNETIC FLOW METER WITH REDUCED POWER CONSUMPTION AND REDUCED EXCITING CURRENT

(75) Inventor: Ikuhiko Ishikawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/201,906

(22) Filed: Aug. 10, 2005

(65) Prior Publication Data

US 2006/0032316 A1  Feb. 16, 2006

(30) Foreign Application Priority Data

Aug. 12, 2004 (JP) ............ P.2004-235009
Nov. 22, 2004 (JP) ............ P.2004-336887
May 31, 2005 (JP) ............ P.2005-159101

(51) Int. Cl.
*G01F 1/58* (2006.01)

(52) U.S. Cl. ............ 702/45; 702/47; 73/861.11

(58) Field of Classification Search ........... 702/45, 702/47
See application file for complete search history.

(56) References Cited

U.S. PATENT DOCUMENTS 4,462,060 A * 7/1984 Schmoock ............ 361/154
4,488,438 A * 12/1984 Tomita ............ 73/861.12
5,621,177 A * 4/1997 Torimaru ............ 73/861.16
6,804,613 B2 * 10/2004 Ishikawa et al. ............ 702/45

FOREIGN PATENT DOCUMENTS

JP   2002-188945   7/2002

* cited by examiner

*Primary Examiner*—Hal Wachsman
(74) *Attorney, Agent, or Firm*—John J. Penny, Jr.; Edwards Angell Palmer & Dodge LLP

(57) ABSTRACT

An electromagnetic flow meter of a switching control system in which a DC voltage is applied to an exciting coil via switching elements, a direction of an exciting current flowing through the exciting coil is switched over at a predetermined excitation timing, and the switching elements are turned ON or OFF so as to hold the exciting current to be a predetermined value. The electromagnetic flow meter has first and second detection resistors which are connected in series to ends of the exciting coil via the switching elements, respectively, wherein a midpoint of the first and second detection resistors is grounded to set a voltage of the midpoint as a circuit reference voltage.

22 Claims, 7 Drawing Sheets

|  | Q1 | Q2 | Q3 | Q4 |
|---|---|---|---|---|
| POSITIVE EXCITATION | SWITCHING CONTROL | OFF | OFF | ON |
| NEGATIVE EXCITATION | ON | SWITCHING CONTROL | ON | OFF |

ELECTROMAGNETIC FLOW METER WITH REDUCED POWER CONSUMPTION AND REDUCED EXCITING CURRENT

CROSS-REFERENCE TO RELATED APPLICATIONS

This application is based upon and claims the benefit of priority from the prior Japanese Patent Applications No. 2004-235009 filed on Aug. 12, 2004, No. 2004-336887 filed on Nov. 22, 2004, and No. 2005-159101 filed on May 31, 2005, the entire contents of which are incorporated herein by reference.

BACKGROUND OF THE INVENTION

1. Field of the Invention

The present invention relates to an electromagnetic flow meter, and more particularly to an electromagnetic flow meter in which the power consumption of an exciting circuit can be reduced.

2. Description of the Related Art

As shown in FIG. 8, an exciting circuit of an electromagnetic flow meter of the related art is configured by a DC power source E, a capacitor C which is connected in parallel to the DC power source E, and an exciting coil COIL. In the figure, Q1 to Q4 denote switching elements each configured by an FET, and D1 to D4 denote parasitic diodes which are connected in parallel to the switching elements Q1 to Q4 and in a direction opposite to the current flow from the DC power source E. The parasitic diodes D1 to D4 are formed in a package during a process of producing the respective FETs, and hence cannot be removed away.

The switching elements Q1, Q2 are FETs which operate while being supplied with a second reference voltage and grounded to a voltage V2, and the switching elements Q3, Q4 are FETs which operate while being supplied with a voltage V1 grounded to a third reference voltage. The voltage V1 is produced at the midpoint of a series connection of a resistor R1 and a Zener diode ZD1 which are connected in parallel to the DC power source E, and the voltage V2 is produced at the midpoint of a series connection of a Zener diode ZD2 and a resistor R2 which are connected in parallel to the DC power source E.

One end (positive side) of the DC power source E is connected to one end 13 of the exciting coil COIL via the switching element Q1. The one end 13 is connected to the other end (negative side) of the DC power source E via the switching element Q3.

The other end 14 of the exciting coil COIL is connected to a first reference voltage, and also to one end of a detection resistor R11 for an exciting current. Furthermore, the one end (positive side) of the DC power source E is connected to the other end 15 of the detection resistor R11 via the switching element Q2. The other end 15 is connected to the other end (negative side) of the DC power source E via the switching element Q4.

The reference numerals T1 and T2 denote timing signals for controlling ON/OFF operations of the switching elements Q1 and Q2 which operate while being supplied with the second reference voltage and grounded to the voltage V2. The timing signals are supplied to the control electrodes of the switching elements Q1 and Q2 (the gates of the FETs) via resistors R3 and R5, isolators P1 and P2 such as photocouplers, and waveform-shaping circuits B1 and B2, respectively. The isolators P1 and P2 are insulating circuits for converting the references of the timing signals T1, T2 which have different reference voltages, to which the second reference voltage is supplied via resistors R4 and R6, and which are grounded to the voltage V2.

The reference numerals T3 and T4 denote timing signals for controlling ON/OFF operations of the switching elements Q3 and Q4 which operate while being supplied with the voltage V1 and grounded to the third reference voltage. The timing signals are supplied to the control electrodes of the switching elements Q3 and Q4 (the gates of the FETs) via resistors R7 and R9, isolators P3 and P4 such as photocouplers, and waveform-shaping circuits B3 and B4, respectively. The isolators P3 and P4 are insulating circuits for converting the references of the timing signals T3, T4 which have different reference voltages, to which the voltage V1 is supplied via resistors R8 and R10, and which are grounded to the third reference voltage.

The exciting current flows alternately in opposite directions through the exciting current detection resistor R11 connected in positive and negative exciting periods. Therefore, a reference voltage VREF which is positive or negative in accordance with the positive and negative exciting periods, and which is proportional to the exciting current is generated between the one end 14 grounded to the first reference voltage, and the other end 15.

The configuration and operation of a controlling circuit which generates the timing signals T1 to T4 for ON/OFF-controlling the switching elements Q1 to Q4 will be described with reference to FIG. 9.

The reference numeral 11 denotes an excitation timing generating circuit which regulates the positive and negative exciting periods, and generates a rectangular wave of a predetermined excitation period. A direct output is supplied as the timing signal T4 to the switching element Q4, and an inverted output through an inverter G3 is supplied as the timing signal T3 to the switching element Q3.

The reference numeral 12 denotes an excitation controlling circuit. In the circuit, the reference voltage VREF which is proportional to the exciting current, and which is positive or negative is supplied to a negative input terminal of a hysteresis comparator CMP. An output of the hysteresis comparator CMP is supplied to AND gates G1, G2, and in addition fed back to a positive input terminal of the hysteresis comparator CMP via a voltage dividing circuit of positive feedback resistors R11, R12. The reference numeral Vs denotes a reference DC power source (reference voltage Vs) which is connected between the resistor R11 and the ground serving as the first reference voltage.

The hysteresis comparator CMP operates in the following manner. When the absolute value of the reference voltage VREF is increased to be larger than the reference voltage Vs, and further increased to be larger than the voltage which is determined by the positive feedback resistors R11, R12, and which corresponds to the hysteresis width, the output is inverted from negative to positive. By contrast, when the absolute value of the reference voltage VREF is decreased to be smaller than the reference voltage Vs, and further decreased to be smaller than the voltage which is determined by the positive feedback resistors R11, R12, and which corresponds to the hysteresis width, the output is inverted from positive to negative. This inverting operations are repeated. The period of the inverting operations depends on the time constant of the control loop including the inductance of the exciting coil COIL, and is designed so as to be sufficiently shorter than the periods of the excitation timing signals.

The AND gate G1 receives the output signals of the hysteresis comparator CMP and the excitation timing generating circuit 11, and sends out the timing signal T1 in accordance with the logical product of the output signals. Similarly, the AND gate G2 receives the output signal of the hysteresis comparator CMP and the inverted output of the excitation timing generating circuit 11, and sends out the timing signal T2 in accordance with the logical product of the output signals.

FIG. 10 illustrates the ON/OFF situations of the switching elements Q1 to Q4 and a switching control mode in the positive and negative exciting periods in the above described configuration. First, by the excitation timing signals T3, T4, in the positive exciting period, the switching element Q3 is regulated to be turned OFF and the switching element Q4 is regulated to be turned ON, and, in the negative exciting period, the switching element Q3 is regulated to be turned ON and the switching element Q4 is regulated to be turned OFF.

In the positive exciting period, the switching element Q2 is turned OFF, and the switching control is conducted by the switching element Q1, and, in the negative exciting period, the switching element Q1 is turned OFF, and the switching control is conducted by the switching element Q2. As a result of the control on the switching elements Q1, Q2, Q3, Q4, in the positive exciting period, the current indicated by i1 in FIG. 10 flows through the switching element Q1, the exciting coil COIL, the reference resistor R11, and the switching element Q4.

The current indicated by i2 in FIG. 10 is a current which is caused to flow through the parasitic diode D3 connected in parallel to the switching element Q3, by an counter electromotive force of the exciting coil COIL when the switching element Q1 is OFF.

In the negative exciting period, a current which is similar to the current i1 flows through the switching element Q2, the detection resistor R11, the exciting coil COIL, and the switching element Q3, so that a constant current control is conducted.

JP-A-2002-188945 (pages 2 and 3, FIG. 3) is referred to as a related art.

In the exciting current of the switching system of the related art, the circuit current flows different paths depending on the ON/OFF states of the switching elements. When the exciting current flowing through the exciting coil is to be controlled, therefore, a current detection resistor for the control must be connected in series to the exciting coil.

Therefore, since the exciting circuit which has the switching elements, and the controlling circuit which produces the timing signals use different signal references, it is required to have different respective power sources. When the timing signals produced in the controlling circuit are to be used in the exciting circuit, consequently, insulating circuits such as isolators must be disposed. As a result, reduction of the power consumption is limited.

SUMMARY OF THE INVENTION

An object of the invention is to provide an electromagnetic flow meter in a small size, with a low-loss, and with a low-noise.

The invention provides an electromagnetic flow meter of a switching control system in which a DC voltage is applied to an exciting coil via switching elements, a direction of an exciting current flowing through the exciting coil is switched over by a predetermined fundamental excitation frequency, and switching of the switching elements are controlled by an excitation switching control frequency which is higher than the fundamental excitation frequency so as to hold the exciting current constant, having first and second detection resistors which are connected in series to ends of the exciting coil via switching elements, respectively, wherein a midpoint of the first and second detection resistors is grounded to set a voltage of the midpoint as a circuit reference voltage.

In the electromagnetic flow meter, a power source for an exciting circuit which drives ON/OFF operations of the switching elements is used also as a power source for a controlling circuit which produces a timing signal for controlling the ON/OFF operations of the switching elements.

In the electromagnetic flow meter, the exciting current is controlled with reference to a positive signal based on one of voltages of the first and second detection resistors.

In the electromagnetic flow meter, the exciting current is controlled with reference to a voltage based on one of currents of the first and second detection resistors that are equal to the exciting current.

The invention also provides an electromagnetic flow meter of a switching control system in which a DC voltage is applied to an exciting coil via switching elements, a direction of an exciting current flowing through the exciting coil is switched over at a predetermined excitation timing, and the switching elements are turned ON or OFF so as to hold the exciting current to be a predetermined value, having first and second detection resistors which are connected in series to ends of the exciting coil via the switching elements, respectively, wherein a midpoint of the first and second detection resistors is grounded to set a voltage of the midpoint as a circuit reference voltage.

In the electromagnetic flow meter, a power source for an exciting circuit which drives ON/OFF operations of the switching elements is used also as a power source for a controlling circuit which produces a timing signal for controlling the ON/OFF operations of the switching elements.

In the electromagnetic flow meter, the exciting current is controlled with reference to a signal based on one of voltages of the first and second detection resistors.

In the electromagnetic flow meter, the exciting current is controlled with reference to a voltage based on one of currents of the first and second detection resistors that are equal to the exciting current.

The invention also provides an electromagnetic flow meter having: a first series circuit having a power source, a first switching element, an exciting coil, and a fourth switching element; a second series circuit having the power source, a second switching element, the exciting coil, and a third switching element; and a third series circuit having the exciting coil, the fourth switching element, and the third switching element, the electromagnetic flow meter of a switching control system in which a direction of an exciting current flowing through the exciting coil is switched over by a predetermined fundamental excitation frequency, and the first switching element and the second switching element are controlled so as to hold the exciting current to be a predetermined value, further having: a first detection resistor which is formed between the third switching element and a circuit reference voltage, and detects the exciting current; and a second detection resistor which is formed between the fourth switching element and the circuit reference voltage, and detects the exciting current.

The invention also provides an electromagnetic flow meter having: a first switching element in which a power source is connected to one end; a second in which the power source is connected to one end; a third switching element in which another end of the first switching element is connected to one end, and a circuit reference voltage is connected to another end; a fourth switching element in which another end of the second switching element is connected to one end, and the circuit reference voltage is connected to another end; and an exciting coil in which a junction of the other end of the first switching element and the one end of the third switching element is connected to one end, and a junction of the other end of the second switching element and the one end of the fourth switching element is connected to another end, the electromagnetic flow meter of a switching control system in which a direction of an exciting current flowing through the exciting coil is switched over by a fundamental excitation frequency, and the first switching element and the second switching element are controlled so as to hold the exciting current constant, further having: a first detection resistor which is formed between the other end of the third switching element and the circuit reference voltage, and detects the exciting current; and a second detection resistor which is formed between the other end of the fourth switching element and the circuit reference voltage, and detects the exciting current.

The electromagnetic flow meter further has: a first Schottky diode which is connected in parallel to the third switching element; and a second Schottky diode which is connected in parallel to the fourth switching element.

The electromagnetic flow meter further has: a third Schottky diode which is connected in parallel to the first switching element; and a fourth Schottky diode which is connected in parallel to the second switching element.

In the electromagnetic flow meter, the first switching element is ON/OFF-controlled based on a reference voltage generated in the second detection resistor, and the second switching element is ON/OFF-controlled based on a reference voltage generated in the second detection resistor.

The electromagnetic flow meter further has a switch which selects the reference voltage of the second detection resistor when the second switching element is OFF and the fourth switching element is ON, and selects the reference voltage of the first detection resistor when the first switching element is OFF and the third switching element is ON.

In the electromagnetic flow meter, the second and third switching elements are turned ON after the first and fourth switching elements are turned OFF, and the first and fourth switching elements are turned ON after the second and third switching elements are turned OFF.

The electromagnetic flow meter further has a normalizing section which normalizes a flow rate signal which is detected from an electrode of a pipe in accordance with the exciting current, based on a ratio of the flow rate signal to an exciting current signal which is detected from a third detection resistor connected in series to the exciting coil.

An electromagnetic flow meter of the invention may be configured in the following manners.

(1) The electromagnetic flow meter may be an electromagnetic flow meter of a switching control system in which a DC voltage is applied to an exciting coil via switching elements, the direction of an exciting current flowing through the exciting coil is switched over by a predetermined fundamental excitation frequency (f1), and switching of the switching elements are controlled by an excitation switching control frequency (f2) which is higher than the fundamental excitation frequency so as to hold the exciting current constant, having first and second detection resistors which are connected in series to ends of the exciting coil via switching elements which are directly connected to the ends of the exciting coil, respectively, and the midpoint of the series-connected first and second detection resistors is grounded to set the voltage of the midpoint as a circuit reference voltage.

(2) In the electromagnetic flow meter, a power source for an exciting circuit which drives ON/OFF operations of the switching elements is used also as a power source for a controlling circuit which produces a timing signal for controlling the ON/OFF operations of the switching elements.

(3) In the electromagnetic flow meter, the exciting current flowing through the exciting coil is controlled with reference to a signal by which the voltage of one of voltages of the first and second detection resistors is positive.

(4) In the electromagnetic flow meter, the exciting current flowing through the exciting coil is controlled with reference to a voltage of one of the first and second detection resistors at which a current identical with the exciting current flowing through the exciting coil is obtained.

(5) The electromagnetic flow meter may be an electromagnetic flow meter of a switching control system in which a DC voltage is applied to an exciting coil via switching elements, the direction of an exciting current flowing through the exciting coil is switched over at a predetermined excitation timing, and ON/OFF operations of the switching elements are controlled so as to hold the exciting current constant, having first and second detection resistors which are connected in series to ends of the exciting coil via the switching elements, respectively, wherein a midpoint of the first and second detection resistors is grounded to set the voltage of the midpoint as a circuit reference voltage.

(6) In the electromagnetic flow meter, a power source for an exciting circuit which drives ON/OFF operations of the switching elements is used also as a power source for a controlling circuit which produces a timing signal for controlling the ON/OFF operations of the switching elements.

(7) In the electromagnetic flow meter, the exciting current flowing through the exciting coil is controlled with reference to a signal by which the voltage of one of voltages of the first and second detection resistors is positive.

(8) In the electromagnetic flow meter, the exciting current flowing through the exciting coil is controlled with reference to a voltage of one of the first and second detection resistors at which a current identical with the exciting current flowing through the exciting coil is obtained.

In the exciting circuit of the switching system for the electromagnetic flow meter of the invention, two detection resistors are used, the two detection resistors are not directly connected to the exciting coil, switching elements are interposed between the exciting coil and the detection resistors, the two detection resistors are connected in series to each other, and the midpoint of the series connection is set to the circuit reference voltage GND, whereby the circuit references of the exciting circuit and the controlling circuit are made identical with each other. Therefore, it is possible to realize a configuration which is not required to have an insulating circuit that is necessary in the related art. As a result, an exciting circuit of a low power consumption can be realized.

As apparent from the above description, it is possible to provide the electromagnetic flow meter in a small size, with a low-loss, and with a low-noise.

DETAILED DESCRIPTION OF THE PREFERRED EMBODIMENTS

Embodiments of the electromagnetic flow meter of the invention will be described with reference to the accompanying drawings. The components which are identical with those of the related art are denoted by the same references.

[First Embodiment]

Figure 1:
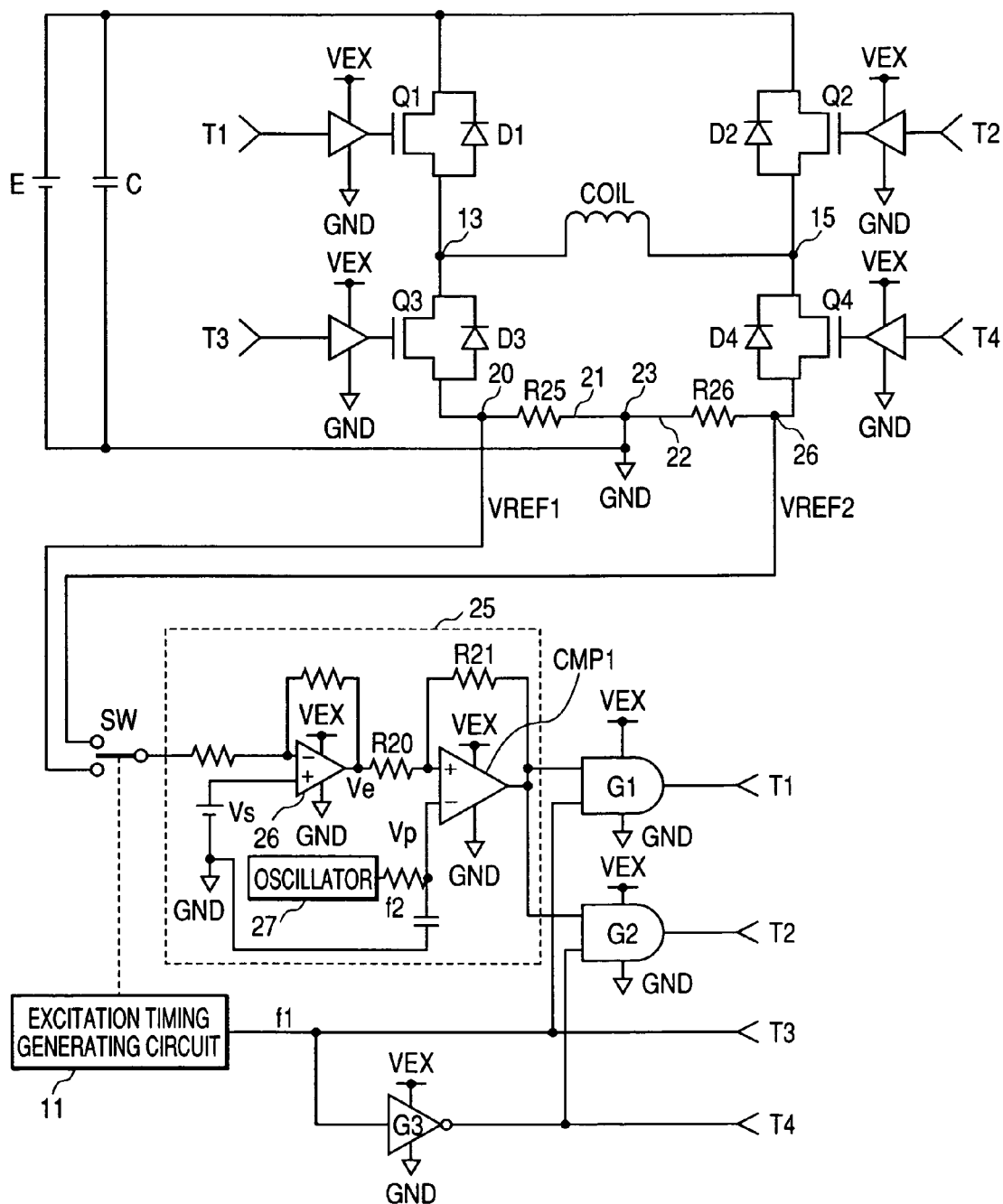
FIG. 1 is an explanation diagram schematically showing the exciting circuit and the controlling circuit of the electromagnetic flow meter of the first embodiment of the invention.

An electromagnetic flow meter of a first embodiment of the invention is an embodiment of a circuit of a fixed switching frequency system. An exciting circuit formed by switching elements, and a controlling circuit which generates ON/OFF timing signals for switching elements are configured as shown in FIG. 1. The exciting circuit has a DC power source E, a capacitor C which is connected in parallel to the DC power source E, switching elements Q1, Q3 and a first detection resistor R25 which are connected in series to one another and in parallel to the DC power source E, and switching elements Q2, Q4 and a second detection resistor R26 which are connected in series to one another and in parallel to the DC power source E. One end 13 of an exciting coil COIL is connected to the midpoint of the series connection of the switching elements Q1 and Q3, and the other end 15 is connected to the midpoint of the series connection of the switching elements Q2 and Q4.

The source of the switching element Q3 is connected to one end of the first detection resistor R25, that of the switching element Q4 is connected to one end 20 of the second detection resistor R25, the other end 21 of the first detection resistor R25 is connected to the other end 22 of the second detection resistor R26, and a junction of the resistors is connected to the minus side of the DC power source E, and grounded to a reference voltage GND.

The switching elements Q1, Q2, Q3, Q4 are FETs which operate while being supplied with a power source voltage VEX and grounded to the reference voltage GND, and comprise parasitic diodes D1, D2, D3, D4 which are connected in parallel to the switching elements and in a direction opposite to the current flow from the DC power source E, respectively.

A waveform shaping circuit B1 which receives a timing signal T1 to apply a waveform shaping process on the signal is connected to the gate of the switching element Q1, a waveform shaping circuit B2 which receives a timing signal T2 to apply a waveform shaping process on the signal is connected to the gate of the switching element Q2, a waveform shaping circuit B3 which receives a timing signal T3 to apply a waveform shaping process on the signal is connected to the gate of the switching element Q3, and a waveform shaping circuit B4 which receives a timing signal T4 to apply a waveform shaping process on the signal is connected to the gate of the switching element Q4.

The waveform shaping circuits B1, B2, B3, B4 are supplied with the power source voltage VEX, and grounded to the reference voltage GND.

In the exciting coil COIL and the first and second detection resistors R25, R26, in the positive exciting period, the exciting current flows through the switching element Q1-->the exciting coil COIL-->the switching element Q4-->the second detection resistor R26, and, in the negative exciting period, the exciting current flows through the switching element Q2-->the exciting coil COIL-->the switching element Q3-->the first detection resistor R25. Namely, the exciting current flows alternately in opposite directions. Therefore, a positive reference voltage VREF2 which is proportional to the exciting current is generated at the one end 26 of the second detection resistor R26 in accordance with the positive exciting period, and a negative reference voltage VREF1 which is proportional to the exciting current is generated at the one end 20 of the first detection resistor R25 in accordance with the negative exciting period.

The controlling circuit has an excitation timing generating circuit 11 which regulates the positive and negative exciting periods, a switch SW which changes over the reference voltage VREF1 from the first detection resistor R25 and the reference voltage VREF2 from the second detection resistor R26, a pulse-width modulation (PWM) excitation controlling circuit 25, AND gates G1, G2, and an inverter G3. The AND gates G1, G2 and the inverter G3 are supplied with the power source voltage VEX, and grounded to the reference voltage GND.

The reference numeral 27 denotes an oscillator which generates a triangular signal Vp. The triangular signal Vp of a fundamental excitation control frequency f2 which is higher than a fundamental excitation frequency f1 is supplied to the negative input terminal of a comparator CMP1.

The excitation timing generating circuit 11 generates a rectangular signal of the predetermined fundamental excitation frequency f1. A direct output is supplied as the timing signal T4 to the switching element Q4 of the exciting circuit, and an inverted output through the inverter G3 is supplied as the timing signal T3 to the switching element Q3.

In the pulse-width modulation (PWM) excitation controlling circuit 25, the difference between the positive or negative voltages which are proportional to the exciting current, i.e., the reference voltage VREF1 or VREF2 from the first and second detection resistors R25, R26, and a CD reference Vs is amplified by an error amplifier 26. An output voltage Ve of the error amplifier 26 is supplied via a resistor R20 to a positive input terminal of the comparator CMP1 having hysteresis characteristics due to positive feedback resistors R20, R21.

An output of the comparator CMP1 is supplied to the AND gates G1, G2, and in addition fed back to the positive input terminal of the comparator CMP1 via the dividing circuit of positive feedback resistors R20, R21 to provide the comparison operation with predetermined hysteresis.

The comparator CMP1 operates in the following manner. When the triangular signal Vp supplied from the oscillator 17 is raised to be higher than the output voltage Ve of the error amplifier 26, and further raised to be higher than the voltage which is determined by the positive feedback resistors R20, R21, and which corresponds to the hysteresis width, the output is inverted from negative to positive. By contrast, when the triangular signal Vp is lowered to be lower than the output voltage Ve of the error amplifier 26, and further lowered to be lower than the voltage which is determined by the positive feedback resistors R20, R21, and which corresponds to the hysteresis width, the output is inverted from positive to negative. These inverting operations are repeated in each period of the triangular signal Vp. As a result of this comparison operation, the pulse-width modulation (PWM) is realized.

The AND gate G1 receives the output of the comparator CMP1 and the timing signal T4, and sends out the timing signal T1 in accordance with the logical product of the inputs. Similarly, the AND gate G2 receives the output of the comparator CMP1 and the timing signal T4, and sends out the timing signal T2 in accordance with the logical product of the inputs.

Figures 2, 3:
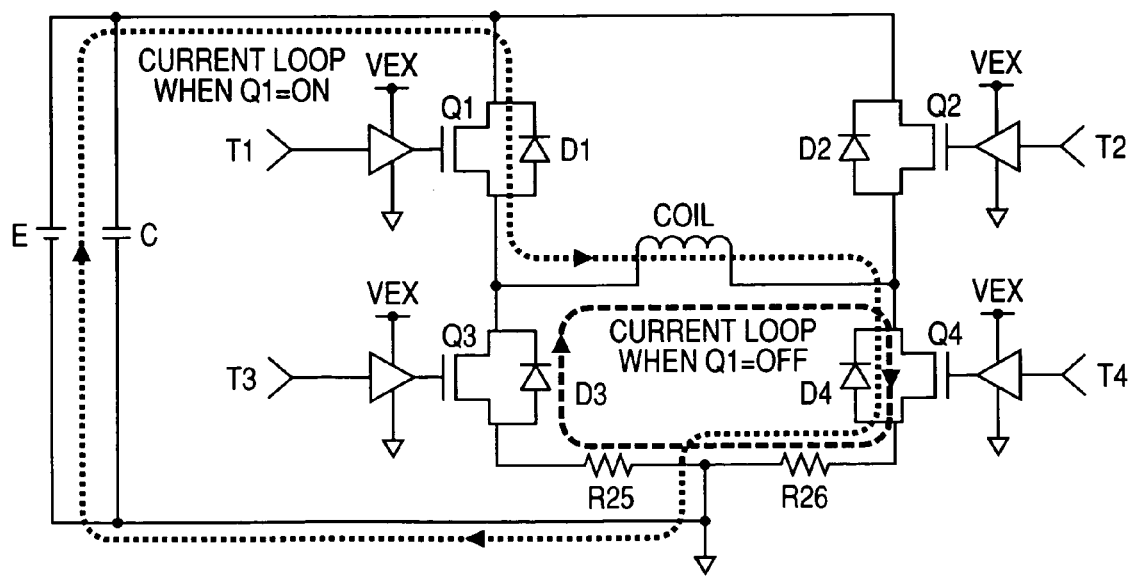
FIG. 2 is a table showing a controlling configuration due to "on/off" of the switching element.
FIG. 3 is a circuit diagram showing a flow operation of the exciting current flowing to the exciting coil.

FIG. 2 illustrates the ON/OFF situations of the switching elements Q1, Q2, Q3, Q4 and the switching control in the positive and negative exciting periods in the above described configuration. First, by the excitation timing signals T3, T4, in the positive exciting period, the switching element Q3 is regulated to be turned OFF and the switching element Q4 is regulated to be turned ON, and, in the negative exciting period, the switching element Q3 is regulated to be turned ON and the switching element Q4 is regulated to be turned OFF. In the positive exciting period, the switching element Q2 is turned OFF, and the switching control is conducted by the switching element Q1, and, in the negative exciting period, the switching element Q1 is turned OFF, and the switching control is conducted by the switching element Q2.

FIG. 3 shows an operation in which the switching element Q1 conducts the switching control, the switching element Q4 is turned ON, and the switching elements Q2, Q3 are turned OFF. Current loops in the cases where the switching element Q1 is turned ON, and where the switching element Q1 is turned OFF are shown in FIG. 3.

In the state where the switching element Q1 is turned ON, a process of supplying a current from the power source E to the exciting coil COIL is conducted, and the current flows through the route of "power source E-->switching element Q1-->exciting coil COIL-->switching element Q4-->second detection resistor R26-->circuit reference voltage GND."

In the state where the switching element Q1 is turned OFF, a process in which the coil current attenuates with a time constant due to the impedance of the coil is conducted, and the current flows through the route of "exciting coil COIL-->switching element Q4-->second detection resistor R26-->first detection resistor R25-->switching element Q3."

In the first detection resistor R25, a current flows only when the switching element Q1 is turned OFF. In the second detection resistor R26, a current which is identical with a current flowing through the exciting coil COIL flows. Under the operation conditions where the switching element Q1 conducts the switching control, the switching element Q4 is ON, and the switching elements Q2, Q3 are OFF, therefore, the switching control is conducted with reference to the reference voltage VREF2 of the second detection resistor R26.

Similarly, under the operation conditions where the switching element Q2 conducts the switching control, the switching element Q3 is ON, and the switching elements Q1, Q4 are OFF, the switching control is conducted with reference to the reference voltage VREF1 of the first detection resistor R25.

The reference voltages are changed over by the excitation timing generating circuit connected to the first and second detection resistors R25, R26.

The selected signal is compared with a predetermined voltage. If the excitation current is lower, the switching element Q1 or the switching element Q2 is turned ON, and, if the excitation current is higher, the switching element Q1 or the switching element Q2 is turned OFF.

As a result, the circuit reference voltage GND of the exciting circuit is identical with that of the controlling circuit, and all the devices can be driven with using the common power source. Therefore, it is possible to realize a low-power consumption exciting circuit which does not require an insulating circuit and plural insulating power source circuits.

[Second Embodiment]

Figure 4:
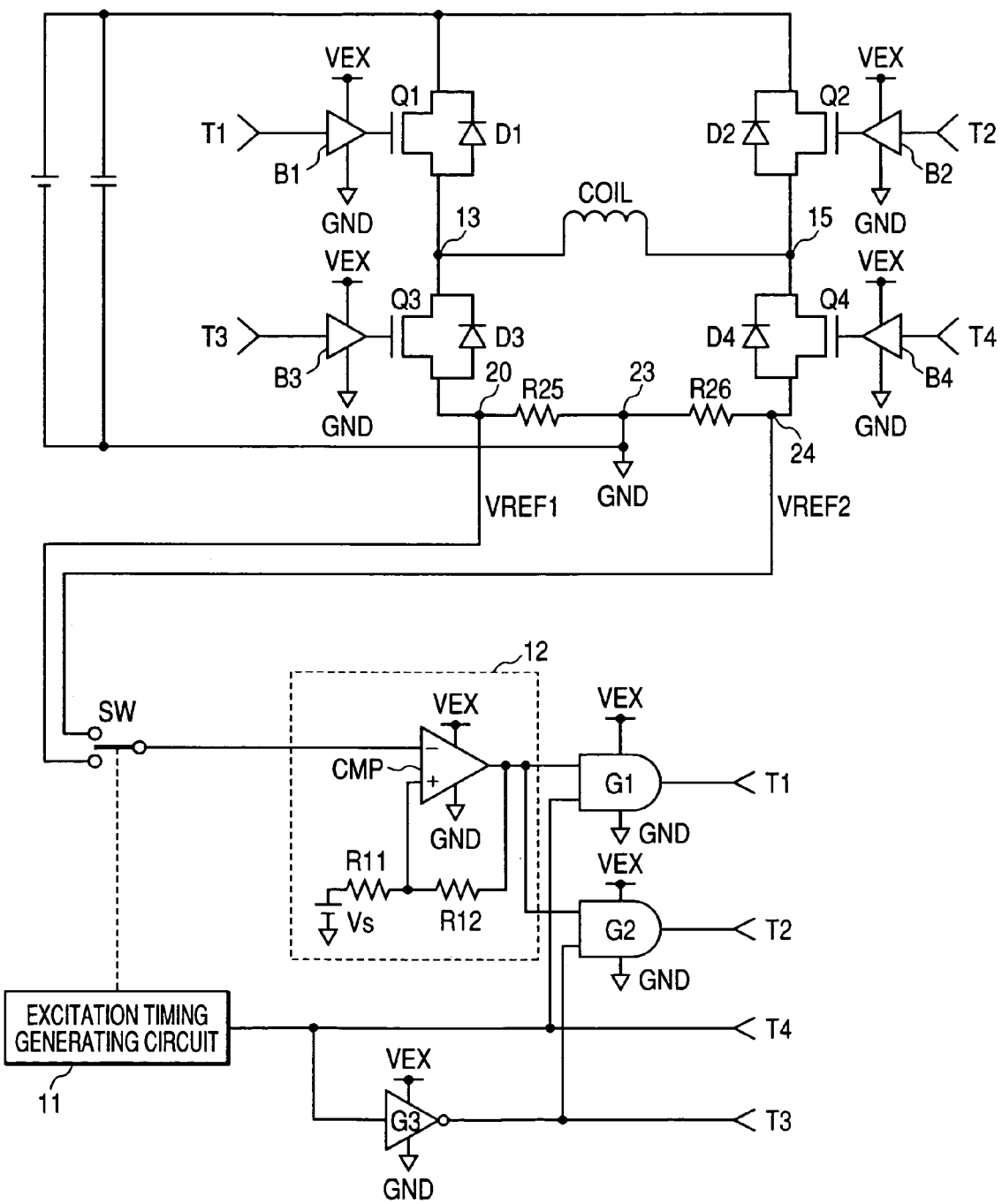
FIG. 4 is an explanation diagram schematically showing the exciting circuit and the controlling circuit of the electromagnetic flow meter of the second embodiment of the invention.

An electromagnetic flow meter of a second embodiment will be described with reference to FIG. 4. The components which are identical with those of the first embodiment are denoted by the same reference numerals, and their description is omitted.

The electromagnetic flow meter of the second embodiment is an embodiment of a circuit in which the switching frequency is changed in accordance with the impedance of the load. An exciting circuit formed by switching elements, and a controlling circuit which generates ON/OFF timing signals for switching elements are configured as shown in FIG. 4. The exciting circuit has a DC power source E, a capacitor C which is connected in parallel to the DC power source E, and an exciting coil COIL. The reference numerals Q1 to Q4 denote switching elements configured by FETs, and D1 to D4 denote parasitic diodes which are connected in parallel to the switching elements Q1 to Q4 and in a direction opposite to the current flow from the DC power source E, respectively. The parasitic diodes D1 to D4 are formed in a package during a process of producing the respective FETs, and hence cannot be removed away.

The switching elements Q1, Q2 are FETs which operate while being supplied with a power source voltage VEX and grounded to a reference voltage GND, and the switching elements Q3, Q4 are FETs which operate while being supplied with the power source voltage VEX and grounded to the reference voltage GND.

One end (positive side) of the DC power source E is connected to one end 13 of the exciting coil COIL via the switching element Q1. The one end 13 is connected to the other end (negative side) of the DC power source E via the switching element Q3 and a first detection resistor R25.

The other end 15 of the exciting coil COIL is connected to the midpoint of the switching elements Q2, Q4. Furthermore, the one end (positive side) of the DC power source E is connected to the other end 15 of the exciting coil COIL via the switching element Q2. The other end 15 is connected to the other end (negative side) of the DC power source E via the switching element Q4 and a second detection resistor R26.

The first detection resistor R25 and the second detection resistor R26 are connected in series to each other, and the midpoint of the series connection is grounded to the reference voltage GND.

The reference numerals T1 to T4 denote timing signals for controlling ON/OFF operations of the switching elements Q1 to Q4 which operate while being supplied with the power source voltage VEX and grounded to the circuit reference voltage GND. The timing signals are supplied to the control electrodes of the switching elements Q1 to Q4 (the gates of the FETs) via waveform-shaping circuits B1 to B4, respectively. The waveform-shaping circuits B1, B2, B3, B4 are supplied with the power source voltage VEX, and grounded to the circuit reference voltage GND.

In the exciting coil COIL and the first and second detection resistors R25, R26, in the positive exciting period, the exciting current flows through the switching element Q1-->the exciting coil COIL-->the switching element Q4-->the second detection resistor R26, and, in the negative exciting period, the exciting current flows through the switching element Q2-->the exciting coil COIL-->the switching element Q3-->the first detection resistor R25. Namely, the exciting current flows alternately in opposite directions. Therefore, a positive reference voltage VREF2 which is proportional to the exciting current is generated at the one end 24 of the second detection resistor R26 in accordance with the positive exciting period, and a negative reference voltage VREF1 which is proportional to the exciting current is generated at the one end 20 of the first detection resistor R25 in accordance with the negative exciting period.

The configuration and operation of a controlling circuit which generates the timing signals T1 to T4 for ON/OFF-controlling the switching elements Q1 to Q4 will be described with reference to FIG. 4.

The reference numeral 11 denotes an excitation timing generating circuit which regulates the positive and negative exciting periods, and generates a rectangular wave of a predetermined excitation period. A direct output is supplied as the timing signal T4 to the switching element Q4, and an inverted output through an inverter G3 is supplied as the timing signal T3 to the switching element Q3. The excitation timing generating circuit controls a switch SW which changes over the reference voltage VREF1 from the first detection resistor R25 and the reference voltage VREF2 from the second detection resistor R26. The reference voltages are generated in proportion to the exciting current in the controlling circuit.

The reference numeral 12 denotes an excitation controlling circuit. In the circuit, the positive or negative reference voltage VREF1 or VREF2 which is proportional to the exciting current is supplied to a negative input terminal of a hysteresis comparator CMP via the switch SW. The hysteresis comparator CMP is supplied with the power source voltage VEX, and grounded to the circuit reference voltage GND. An output of the hysteresis comparator CMP is supplied to AND gates G1, G2, and in addition fed back to a positive input terminal of the hysteresis comparator CMP via a voltage dividing circuit of positive feedback resistors R11, R12. The reference numeral Vs denotes a reference DC power source (reference voltage Vs) which is connected between the resistor R11 and the ground serving as the circuit reference voltage GND.

The hysteresis comparator CMP operates in the following manner. When the absolute value of the reference voltage VREF1 or VREF2 is increased to be larger than the reference voltage Vs, and further increased to be larger than the voltage which is determined by the positive feedback resistors R11, R12, and which corresponds to the hysteresis width, the output is inverted from negative to positive. By contrast, when the absolute value of the reference voltage VREF1 or VREF2 is decreased to be smaller than the reference voltage Vs, and further decreased to be smaller than the voltage which is determined by the positive feedback resistors R11, R12, and which corresponds to the hysteresis width, the output is inverted from positive to negative. This inverting operations are repeated. The period of the inverting operations depends on the time constant of the control loop including the inductance of the exciting coil COIL, and is designed so as to be sufficiently shorter than the periods of the excitation timing signals.

The AND gate G1 receives the output signals of the hysteresis comparator CMP and the excitation timing generating circuit 11, and sends out the timing signal T1 in accordance with the logical product of the output signals. Similarly, the AND gate G2 receives the output signal of the hysteresis comparator CMP, the inverted output signal of the excitation timing generating circuit 11, and the timing signal T3, and sends out the timing signal T2 in accordance with the logical product of the signals.

FIG. 2 illustrates the ON/OFF situations of the switching elements Q1 to Q4 and the switching control in the positive and negative exciting periods in the above described configuration. First, by the excitation timing signals T3, T4, in the positive exciting period, the switching element Q3 is regulated to be turned OFF and the switching element Q4 is regulated to be turned ON, and, in the negative exciting period, the switching element Q3 is regulated to be turned ON and the switching element Q4 is regulated to be turned OFF.

In the same manner as the first embodiment, FIG. 3 shows an operation in which the switching element Q1 conducts the switching control, the switching element Q4 is turned ON, and the switching elements Q2, Q3 are turned OFF. Current loops in the cases where the switching element Q1 is turned ON, and where the switching element Q1 is turned OFF are shown in FIG. 3.

In the state where the switching element Q1 is turned ON, a process of supplying a current from the power source to the exciting coil COIL is conducted, and the current flows through the route of "power source-->switching element Q1-->exciting coil COIL-->switching element Q4-->second detection resistor R26-->circuit reference voltage GND."

In the state where the switching element Q1 is turned OFF, a process in which the coil current attenuates with a time constant due to the impedance of the coil is conducted, and the current flows through the route of "exciting coil COIL-->switching element Q4-->second detection resistor R26-->first detection resistor R25-->switching element Q3."

In the first detection resistor R25, a current flows only when the switching element Q1 is turned OFF. In the second detection resistor R26, a current which is identical with a current flowing through the exciting coil COIL flows. Under the operation conditions where the switching element Q1 conducts the switching control, the switching element Q4 is ON, and the switching elements Q2, Q3 are OFF, therefore, the switching control is conducted with reference to the reference voltage VREF2 of the second detection resistor R26.

Similarly, under the operation conditions where the switching element Q2 conducts the switching control, the switching element Q3 is ON, and the switching elements Q1, Q4 are OFF, the switching control is conducted with reference to the reference voltage VREF1 of the first detection resistor R25.

The reference voltages are changed over by the excitation timing generating circuit 11 connected to the first and second detection resistors R25, R26.

The selected signal is compared with a predetermined voltage. If the excitation current is lower, the switching element Q1 or the switching element Q2 is turned ON, and, if the excitation current is higher, the switching element Q1 or the switching element Q2 is turned OFF.

As a result, the circuit reference voltage of the exciting circuit is identical with that of the controlling circuit, and all the devices can be driven with using the common power source. Therefore, it is possible to realize a low-power consumption exciting circuit which does not require an insulating circuit and plural insulating power source circuits.

In the exciting circuit of the switching system, two detection resistors are used, the two detection resistors are not directly connected to the exciting coil, switching elements are interposed between the exciting coil and the detection resistors, the two detection resistors are connected in series to each other, and the midpoint of the series connection is set to the circuit reference voltage GND, whereby the circuit references of the exciting circuit and the controlling circuit are made identical with each other. Therefore, a low-power consumption exciting circuit which is not required to have an insulating circuit that is necessary in the related art is provided.

[Third Embodiment]

An electromagnetic flow meter of a third embodiment will be described with reference to FIG. 5. The components which are identical with those of the first embodiment are denoted by the same reference numerals, and their description is omitted.

Figure 5:
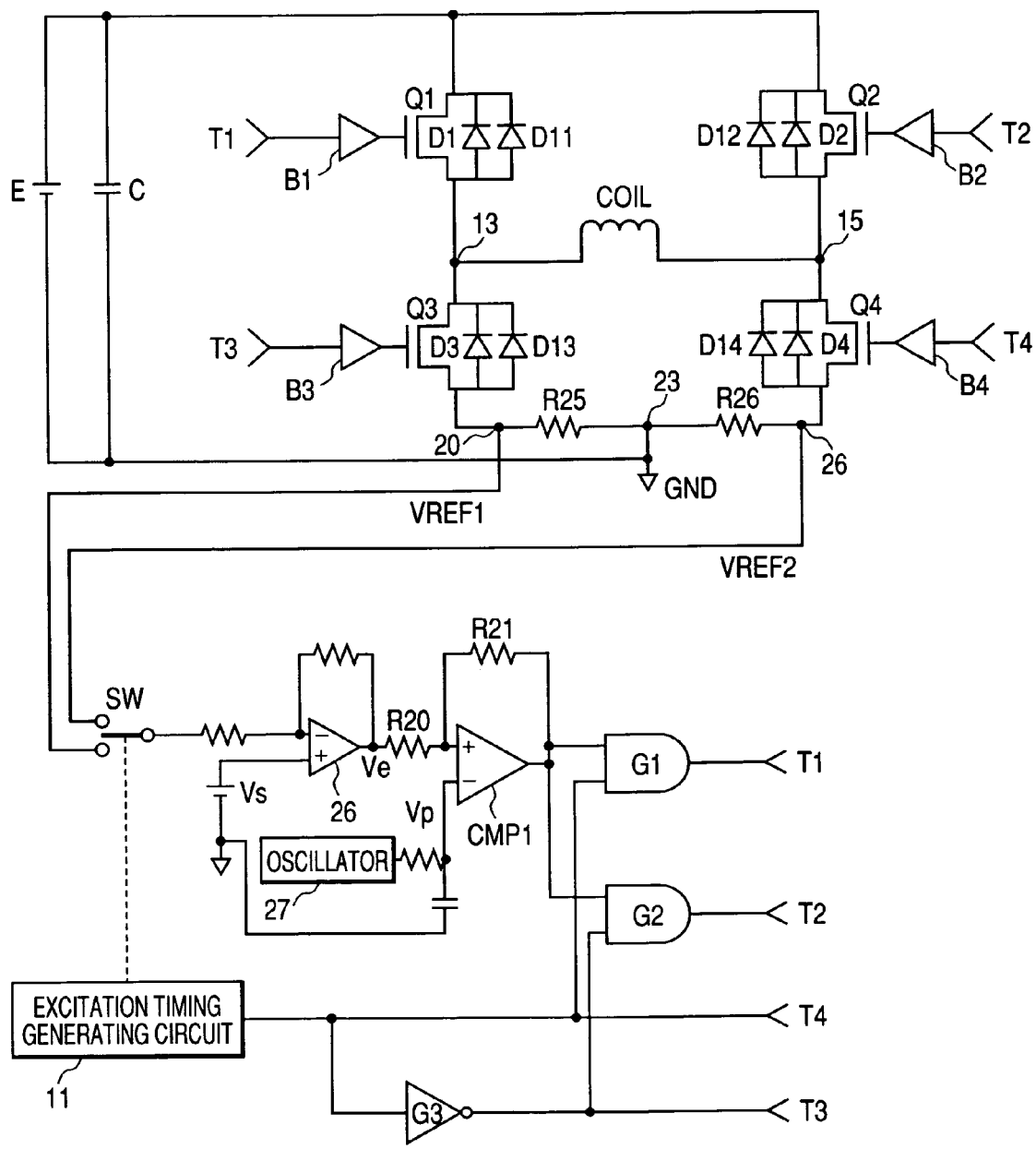
FIG. 5 is a block diagram showing the third embodiment of the invention.

In the same manner as the first embodiment of FIG. 1, the third embodiment of FIG. 5 is characterized in the configuration related to the first detection resistor R25 and the second detection resistor R26. The third embodiment of FIG. 5 is characterized also in that a Schottky diode D11, a Schottky diode D12, a Schottky diode D13, and a Schottky diode D14 are disposed.

The configuration of the third embodiment of FIG. 5 will be described. The switching elements (Q1 to Q4) which are first to fourth switching elements are formed by FETs (field effect transistors), and comprise parasitic diodes (D1 to D4), respectively. In the third embodiment of FIG. 5, the switching elements (Q1 to Q4) and the parasitic diodes (D1 to D4) are integrated with each other, respectively.

The Schottky diode D11 is connected in parallel to the switching element Q1 to be equivalently connected in parallel to the parasitic diode D1. The Schottky diode D12 is connected in parallel to the switching element Q2 to be equivalently connected in parallel to the parasitic diode D2. The Schottky diode D13 is connected in parallel to the switching element Q3 to be equivalently connected in parallel to the parasitic diode D3. Moreover, the Schottky diode D14 is connected in parallel to the switching element Q4 to be equivalently connected in parallel to the parasitic diode D4.

Specifically, the anodes of the Schottky diodes (D11 to D14) are connected to the sources of the switching elements (Q1 to Q4), and the cathodes of the Schottky diodes (D11 to D14) are connected to the drains of the switching elements (Q1 to Q4), respectively.

The third embodiment of FIG. 5 has a first series circuit having the power source E, the switching element Q1, the Schottky diode D11, the exciting coil COIL, the switching element Q4, the Schottky diode D14, and the second detection resistor R26. The third embodiment of FIG. 5 further has a second series circuit having the power source E, the switching element Q2, the Schottky diode D12, the exciting coil COIL, the switching element Q3, and the Schottky diode D13.

The third embodiment of FIG. 5 further has a third series circuit having the exciting coil COIL, the switching element Q4, the Schottky diode D14, the second detection resistor R26, the first detection resistor R25, the switching element Q3, and the Schottky diode D13. The third embodiment of FIG. 5 further has a third series circuit having the exciting coil COIL, the switching element Q1, the Schottky diode D11, the switching element Q2, and the Schottky diode D12.

The negative terminal of the power source E and controlling circuit (the error amplifier 26, etc.) are connected to the circuit reference voltage GND. The switching elements (Q1 to Q4) are switched over by the predetermined fundamental excitation frequency (f1), and ON/OFF-controlled by an excitation switching control frequency (f2) so as to cause the exciting current to have a predetermined value.

One end (drain) of the switching element Q1 serving as the first switching element is connected to the positive terminal of the power source E, and also one end (drain) of the switching element Q2 serving as the second switching element is connected to the positive terminal of the power source E.

One end (drain) of the switching element Q3 serving as the third switching element is connected to the other end (source) of the switching element Q1, and the other end (source) of the switching element Q3 is connected to the circuit reference voltage GND via the first detection resistor R25.

One end (drain) of the switching element Q4 serving as the fourth switching element is connected to the other end (source) of the switching element Q2, and the other end (source) of the switching element Q4 is connected to the circuit reference voltage GND via the second detection resistor R26.

The one end 13 of the exciting coil COIL is connected to the junction of the other end (source) of the switching element Q1 and the one end (drain) of the switching element Q3, and the other end 15 of the exciting coil COIL is connected to the junction of the other end (source) of the switching element Q2 and the one end (drain) of the switching element Q4.

The first detection resistor R25 is formed between the other end (source) of the switching element Q3 and the circuit reference voltage GND, and the second detection resistor R26 is formed between the other end (source) of the switching element Q4 and the circuit reference voltage. GND.

The operation of the third embodiment of FIG. 5 will be described in detail.

First, a period (state 1) in which the switching element Q1 is ON, the switching element Q2 is OFF, the switching element Q3 is OFF, and the switching element Q4 is ON will be described. At this time, the Schottky diodes (D11 to D14) are turned OFF, and the switch SW selects the reference voltage VREF2 so that the reference voltage VREF2 is connected to the excitation controlling circuit 12.

At this time, the power source E is applied to the exciting coil COIL, and the coil is excited in the positive direction. In the second detection resistor R26, the reference voltage VREF2 (VREF2>0) which is proportional to the exciting current flowing through the switching element Q1, the exciting coil COIL, and the switching element Q4 is generated.

When the reference voltage VREF2 is increased to a predetermined value, the switching element Q1 is changed from the ON state to the OFF state, and the Schottky diode D13 is changed from the OFF state to the ON state, so that state 1 is transferred to state 2.

Second, a period (state 2) in which the switching element Q1 is OFF, the switching element Q2 is OFF, the switching element Q3 is OFF, and the switching element Q4 is ON will be described. At this time, the Schottky diode D11 is OFF, the Schottky diode D12 is OFF, the Schottky diode D13 is ON, the Schottky diode D14 is OFF, and the switch SW selects the reference voltage VREF2 so that the reference voltage VREF2 is connected to the excitation controlling circuit 12.

At this time, the magnetic flux of the exciting coil COIL is generally held, but partly reset by voltages generated in the switching element Q4, the second detection resistor R26, the first detection resistor R25, and the Schottky diode D13. In the second detection resistor R26, the reference voltage VREF2 (VREF2>0) which is proportional to the exciting current flowing through the exciting coil COIL and the switching element Q4 is generated.

When the reference voltage VREF2 is decreased to a predetermined value, the switching element Q1 is changed from the OFF state to the ON state, and the Schottky diode D13 is changed from the ON state to the OFF state, so that state 2 is transferred to state 1. At this time, the recovery current does not flow through the Schottky diode D13, and the turn-on surge current of the switching element Q1 does not through the second detection resistor R26.

In the third embodiment of FIG. 5, the magnetic flux of the exciting coil in the positive direction is controlled in this way. Specifically, the ON/OFF operation of the switching element Q1 is controlled based on the reference voltage VREF2 generated in the second detection resistor R26.

Third, a period (state 3) in which the switching element Q1 is OFF, the switching element Q2 is ON, the switching element Q3 is ON, and the switching element Q4 is OFF will be described. At this time, the Schottky diodes (D11 to D14) are turned OFF, and the switch SW selects the reference voltage VREF1 so that the reference voltage VREF1 is connected to the excitation controlling circuit 12.

At this time, the power source E is applied to the exciting coil COIL, and the coil is excited in the negative direction. In the first detection resistor R25, the reference voltage VREF1 (VREF1>0) which is proportional to the exciting current flowing through the switching element Q2, the exciting coil COIL, and the switching element Q3 is generated.

When the reference voltage VREF1 is increased to a predetermined value, the switching element Q2 is changed from the ON state to the OFF state, and the Schottky diode D14 is changed from the OFF state to the ON state, so that state 3 is transferred to state 4.

Fourth, a period (state 4) in which the switching element Q1 is OFF, the switching element Q2 is OFF, the switching element Q3 is ON, and the switching element Q4 is OFF will be described. At this time, the Schottky diode D11 is OFF, the Schottky diode D12 is OFF, the Schottky diode D13 is OFF, and the Schottky diode D14 is ON, and the switch SW selects the reference voltage VREF1 so that the reference voltage VREF1 is connected to the excitation controlling circuit 12.

At this time, the magnetic flux of the exciting coil COIL is generally held, but partly reset by voltages generated in the switching element Q3, the first detection resistor R25, and the Schottky diode D14. In the first detection resistor R25, the reference voltage VREF1 (VREF1>0) which is proportional to the exciting current flowing through the exciting coil COIL and the switching element Q3 is generated.

When the reference voltage VREF1 is decreased to a predetermined value, the switching element Q2 is changed from the OFF state to the ON state, and the Schottky diode D14 is changed from the ON state to the OFF state, so that state 4 is transferred to state 3. At this time, the recovery current does not flow through the Schottky diode D14, and the turn-on surge current of the switching element Q2 does not through the first detection resistor R25.

In the third embodiment of FIG. 5, the magnetic flux of the exciting coil in the negative direction is controlled in this way. Specifically, the ON/OFF operation of the switching element Q2 is controlled based on the reference voltage VREF1 generated in the first detection resistor R25.

The switching over from the excitation in the positive direction to that in the negative direction will be described in detail.

In the positive excitation (state 1), a current flows from the one end 13 to the other end 15. When all the switching elements (Q1 to Q4) are turned OFF, the function of the exciting coil COIL causes the Schottky diode D11 to be turned OFF, the Schottky diode D12 to be turned ON, the Schottky diode D13 to be turned ON, and the Schottky diode D14 to be turned OFF.

When the switching element Q1 is turned OFF, the switching element Q2 is turned ON, the switching element Q3 is turned ON, and the switching element Q4 is turned OFF, the excitation is conducted in the negative direction (state 4), and a current from the other end 15 to the one end 13.

Specifically, the switching elements Q1, Q4 are turned OFF, and the Schottky diodes D12, D13 are turned ON. Thereafter, the switching elements Q2, Q3 are turned ON.

At this time, the switching elements Q2, Q3 are turned ON at zero voltage. Therefore, the loss and the noise level are low.

The switching over from the excitation in the negative direction (state 4) to the excitation in the negative direction (state 1) will be described in detail. The switching elements Q2, Q3 are turned OFF, and the Schottky diodes D11, D14 are turned ON. Thereafter, the switching elements Q1, Q4 are turned ON.

At this time, the switching elements Q1, Q4 are turned ON at zero voltage. Therefore, the loss and the noise level are low.

The above is summarized as follows. When the switching element Q2 is OFF and the switching element Q4 is ON, the switch SW selects the reference voltage VREF2 of the second detection resistor R26, and, when the switching element Q1 is OFF and the switching element Q3 is ON, the switch selects the reference voltage VREF1 of the first detection resistor R25.

In the third embodiment of FIG. 5, the parasitic diodes (D1 to D4) are always turned OFF by the functions of the Schottky diodes (D11 to D14). Specifically, the forward voltage drops of the parasitic diodes (D1 to D4) are about 0.6 V, and those of the Schottky diodes (D11 to D14) are about 0.4 V.

In the third embodiment of FIG. 5, therefore, the recovery current is not caused in the Schottky diodes D13, D14, the switching elements (Q1 to Q4) are turned ON at zero voltage, and the forward voltage drops of the Schottky diodes (D11 to D14) are small. Therefore, the loss and the noise level are low. Since the forward voltage drops of the Schottky diodes (D11 to D14) are small, moreover, the excitation switching control frequency (f2) is low, and the loss and the noise level are low.

[Fourth Embodiment]

Figure 6:
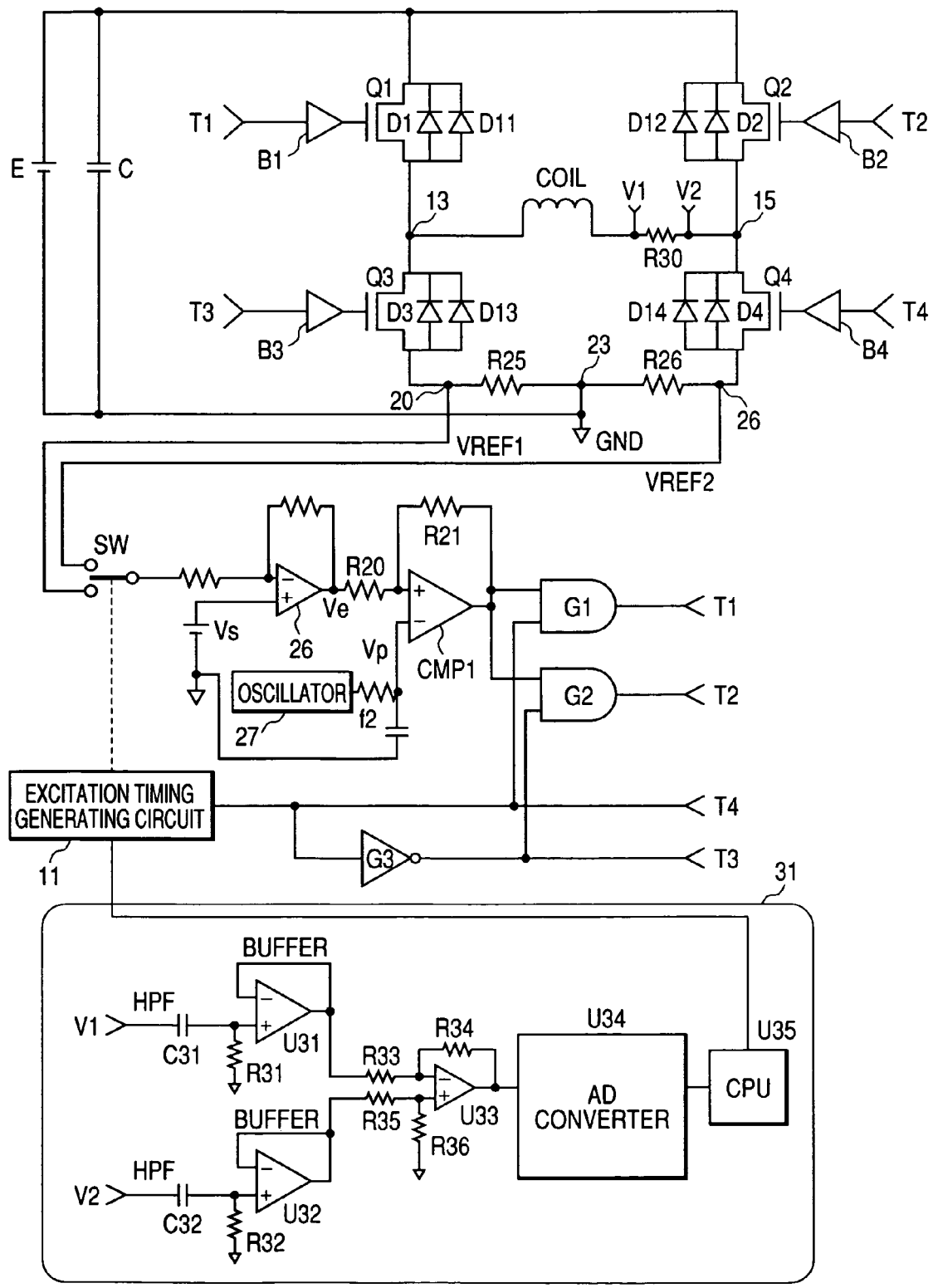
FIG. 6 is a block diagram showing the fourth embodiment of the invention.

An electromagnetic flow meter of, a third embodiment will be described with reference to FIGS. 6 and 7. FIG. 6 is a diagram showing a fourth embodiment of the invention. The components which are identical with those of the third embodiment of FIG. 5 are denoted by the same reference numerals, and their description is omitted.

In the same manner as the third embodiment of FIG. 5, the fourth embodiment of FIG. 6 is characterized in the configuration related to the first detection resistor R25 and the second detection resistor R26. The fourth embodiment of FIG. 6 is characterized also in a configuration related to a third detection resistor R30, and also in a configuration related to means for normalizing a flow rate signal.

The third detection resistor R30 is connected in series to the exciting coil COIL. More specifically, the first, second, third, and fourth series circuits of the third embodiment of FIG. 5 comprise the third detection resistor R30. One end 13 of a series circuit of the exciting coil COIL and the third detection resistor R30 is connected to the junction of the other end (source) of the switching element Q1 and the one end (drain) of the switching element Q3, and the other end 15 of the series circuit of the exciting coil COIL and the third detection resistor R30 is connected to the junction of the other end (source) of the switching element Q2 and the one end (drain) of the switching element Q4.

The voltage of the one end of the third detection resistor R30 is a voltage V1, and that of the other end of the third detection resistor R30 is a voltage V2. The voltages V1 and V2 are changed in correct proportion to the exciting current flowing through the exciting coil COIL.

An exciting current detection circuit 31 generates an exciting current signal S31 from the voltages V1 and V2. Specifically, an inverting input end of a differential amplifier U33 is connected to the voltage V1 via a buffer including a resistor R33 and an error amplifier U31, and a high-pass filter (HPF) including a capacitor C31 and a resistor R31. A non-inverting input end of the differential amplifier U33 is connected to the voltage V2 via a buffer including a resistor R35 and an error amplifier U32, and a high-pass filter (HPF) including a capacitor C32 and a resistor R32.

An input of an A/D converter U34 is connected to an output of the differential amplifier U33. An input of a microprocessor (CPU) U35 is connected to an output of the A/D converter U34, and that of the excitation timing generating circuit 11.

The differential amplifier U33 outputs an analog value which is a difference between the voltages V1 and V2. The A/D converter U34 converts the analog value to a digital value to generate an exciting current signal S31. In this way, the exciting current signal S31 is generated from the voltages V1 and V2 produced in the third detection resistor R30.

Figure 7:
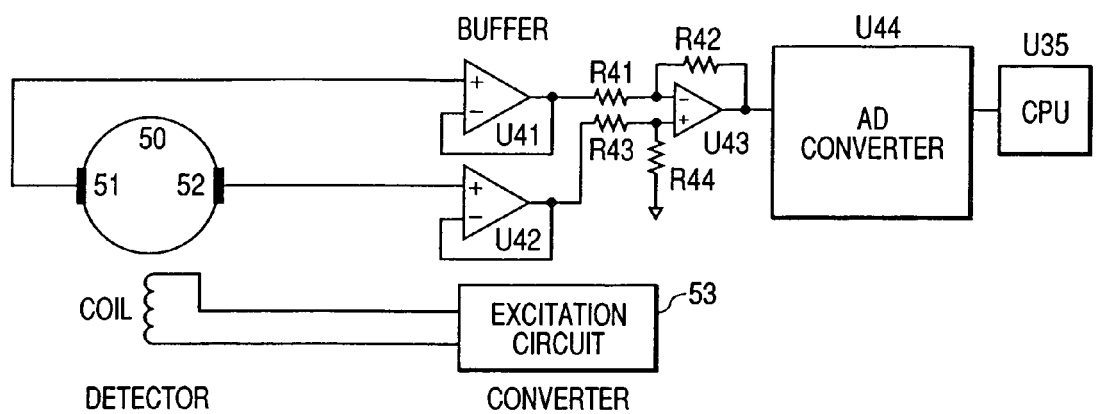
FIG. 7 is a block diagram showing the fourth embodiment of the invention.
Figure 8:
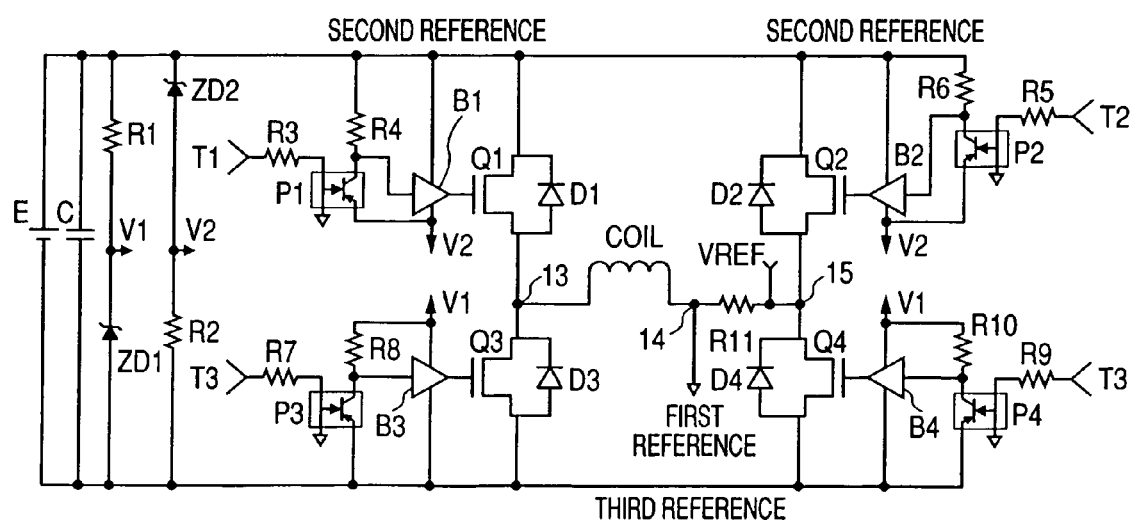
FIG. 8 is an explanation diagram schematically showing the exciting circuit in the prior art.
Figure 9:
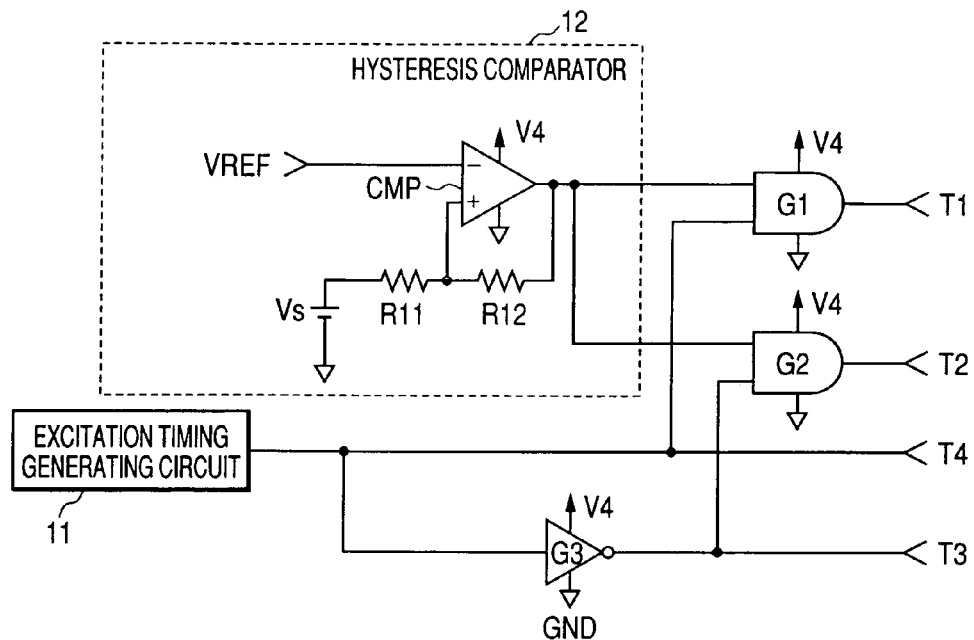
FIG. 9 is an explanation diagram schematically showing the controlling circuit in the prior art.
Figure 10:
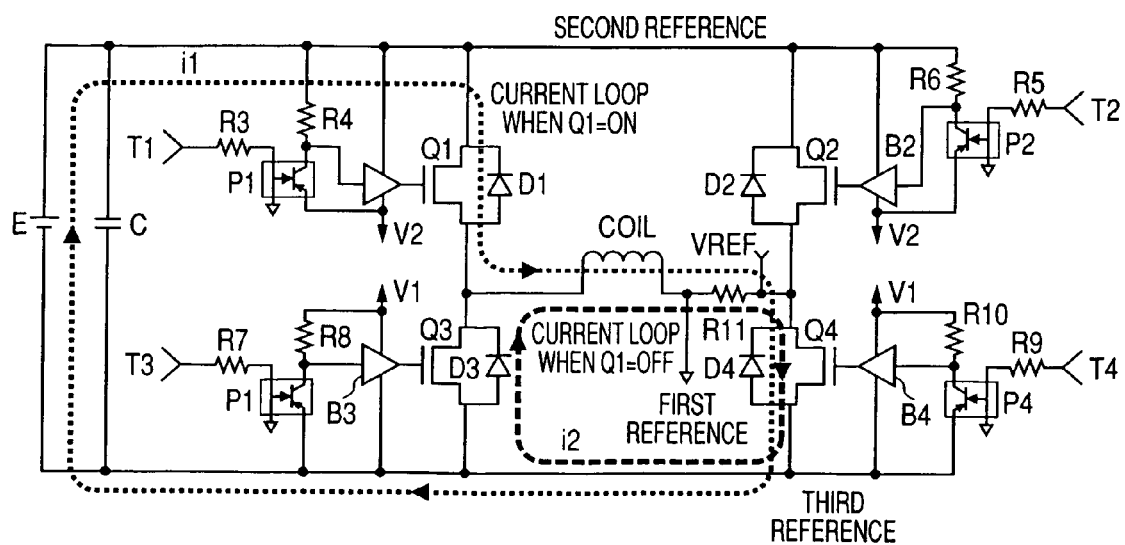
FIG. 10 is a circuit diagram showing the flow operation of the exciting current in the prior art.

FIG. 7 is a diagram showing the fourth embodiment of the invention. The components which are identical with those of the third embodiment of FIG. 5 are denoted by the same reference numerals.

First, a detector will be described. A pipe 50 through which fluid flows has electrodes 51 and 52. The exciting coil COIL is placed in adjacent to the pipe 50.

Next, a converter will be described. An exciting circuit 53 which corresponds to the fourth embodiment of FIG. 6 is connected to the exciting coil COIL. An inverting input end of a differential amplifier U43 is connected to the electrode 51 via a buffer including a resistor R41 and an error amplifier U41. A non-inverting input end of the differential amplifier U43 is connected to the electrode 52 via a buffer including a resistor R43 and an error amplifier U42.

An input of an A/D converter U44 is connected to an output of the differential amplifier U43. An input of the microprocessor (CPU) U35 is connected to an output of the A/D converter U34.

The differential amplifier U43 outputs an analog value which is a difference between a voltage produced in the electrode 51 and that produced in the electrode 52. The A/D converter U44 converts the analog value to a digital value to generate a flow rate signal S41. In this way, the flow rate signal S41 is generated from the voltages produced in the electrodes 51 and 52 of the pipe 50 in accordance to the exciting current of the exciting coil COIL.

The microprocessor U35 calculates a ratio (S41/S31) of the flow rate signal S41 from the AD converter U44 of FIG. 7 to the exciting current signal S31 from the A/D converter U34 of FIG. 6, and normalizes the flow rate signal. The configuration related to the microprocessor U35 forms the means for normalizing the flow rate signal.

The operation of the fourth embodiment of FIGS. 6 and 7 will be described.

When the exciting current of the exciting coil COIL is decreased, the flow rate signal S41 detected in the electrodes 51 and 52 is decreased, but the ratio of the flow rate signal S41 to the exciting current signal S31 is little changed.

When the exciting current of the exciting coil COIL is increased, the flow rate signal S41 detected in the electrodes 51 and 52 is increased, but the ratio of the flow rate signal S41 to the exciting current signal S31 is little changed.

As described above, in the fourth embodiment of FIGS. 6 and 7, the flow rate of the fluid which flows through the pipe 50 is measured, and transmitted.

Therefore, the fourth embodiment of FIGS. 6 and 7 can provide an electromagnetic flow meter of a high measurement accuracy which does not depend on the exciting current. In the same manner as the third embodiment of FIG. 5, the fourth embodiment of FIGS. 6 and 7 can provide the electromagnetic flow meter in a small size, with a low-loss, and with a low-noise.

In the fourth embodiment of FIGS. 6 and 7, it is possible also to estimate the exciting current from the first detection resistor R25 and the second detection resistor R26. In this case, however, a high measurement accuracy cannot be obtained. As a result of specific implementation experiments and studies, it has been proved that the configuration of the fourth embodiment of FIGS. 6 and 7 provides the highest commercial value.

In the embodiments described above, the switching elements (Q1 to Q4) are formed by FETs (field effect transistors). Alternatively, the switching elements (Q1 to Q4) may be formed by bipolar transistors. Also in the alternative, a substantially identical configuration is obtained, and equivalent effects can be attained. In the case of bipolar transistors, there is no component corresponding to the parasitic diodes (D1 to D4).

The invention is not restricted to the embodiments described above, and includes many changes and modifications without departing from the spirit of the invention.

What is claimed is:

1. In an electromagnetic flow meter of a switching control system in which a DC voltage is applied to an exciting coil via switching elements, a direction of an exciting current flowing through the exciting coil is switched over by a predetermined fundamental excitation frequency, and switching of the switching elements are controlled by an excitation switching control frequency which is higher than the fundamental excitation frequency of said exciting coil so as to hold the exciting current constant, the electromagnetic flow meter further comprising:

first and second detection resistors which are connected in series to ends of the exciting coil via the switching elements, respectively, wherein a midpoint of the first and second detection resistors is grounded to set a voltage of the midpoint as a circuit reference voltage of said electromagnetic flow meter.

2. The electromagnetic flow meter according to claim 1, wherein a power source for an exciting circuit which drives ON/OFF operations of the switching elements is used also as a power source for a controlling circuit which produces a timing signal for controlling the ON/OFF operations of the switching elements.

3. The electromagnetic flow meter according to claim 1, wherein the exciting current is controlled with reference to a positive signal based on one of voltages of the first and second detection resistors.

4. The electromagnetic flow meter according to claim 1, wherein the exciting current is controlled with reference to a voltage based on one of currents of the first and second detection resistors that are equal to the exciting current.

5. In an electromagnetic flow meter of a switching control system in which a DC voltage is applied to an exciting coil via switching elements, a direction of an exciting current flowing through the exciting coil is switched over at a predetermined excitation timing, and the switching elements are turned ON or OFF so as to hold the exciting current to be a predetermined value, the electromagnetic flow meter further comprising:
first and second detection resistors which are connected in series to ends of the exciting coil via the switching elements, respectively,
wherein a midpoint of the first and second detection resistors is grounded to set a voltage of the midpoint as a circuit reference voltage of said electromagnetic flow meter.

6. The electromagnetic flow meter according to claim 5, wherein a power source for an exciting circuit which drives ON/OFF operations of the switching elements is used also as a power source for a controlling circuit which produces a timing signal for controlling the ON/OFF operations of the switching elements.

7. The electromagnetic flow meter according to claim 5, wherein the exciting current is controlled with reference to a positive signal based on one of voltages of the first and second detection resistors.

8. The electromagnetic flow meter according to claim 5, wherein the exciting current is controlled with reference to a voltage based on one of currents of the first and second detection resistors that are equal to the exciting current.

9. In an electromagnetic flow meter comprising: a first series circuit having a power source, a first switching element, an exciting coil, and a fourth switching element; a second series circuit having the power source, a second switching element, the exciting coil, and a third switching element; and a third series circuit having the exciting coil, the fourth switching element, and the third switching element, the electromagnetic flow meter of a switching control system in which a direction of an exciting current flowing through the exciting coil is switched over by a predetermined fundamental excitation frequency, and the first switching element and the second switching element are controlled so as to hold the exciting current to be a predetermined value, the electromagnetic flow meter further comprising:
a first detection resistor which is formed between the third switching element and a circuit reference voltage, and detects the exciting current; and
a second detection resistor which is formed between the fourth switching element and the circuit reference voltage, and detects the exciting current.

10. The electromagnetic flow meter according to claim 9, further comprising:
a first Schottky diode which is connected in parallel to the third switching element; and
a second Schottky diode which is connected in parallel to the fourth switching element.

11. The electromagnetic flow meter according to claim 10, further comprising:
a third Schottky diode which is connected in parallel to the first switching element; and
a fourth Schottky diode which is connected in parallel to the second switching element.

12. The electromagnetic flow meter according to claim 9, further comprising:
a first Schottky diode which is connected in parallel to the third switching element; and
a second Schottky diode which is connected in parallel to the fourth switching element.

13. The electromagnetic flow meter according to claim 12, further comprising:
a third Schottky diode which is connected in parallel to the first switching element; and
a fourth Schottky diode which is connected in parallel to the first switching element.

14. The electromagnetic flow meter according to claim 9, wherein the first switching element is ON/OFF-controlled based on a reference voltage generated in the second detection resistor, and
the second switching element is ON/OFF-controlled based on a reference voltage generated in the first detection resistor.

15. The electromagnetic flow meter according to claim 14, further comprising:
a switch which selects the reference voltage of the second detection resistor when the second switching element is OFF and the fourth switching element is ON, and selects the reference voltage of the first detection resistor when the first switching element is OFF and the third switching element is ON.

16. The electromagnetic flow meter according to claim 9, wherein the second and third switching elements are turned ON after the first and fourth switching elements are turned OFF, and the first and fourth switching elements are turned ON after the second and third switching elements are turned OFF.

17. The electromagnetic flow meter according to claim 9, further comprising:
a normalizing section which normalizes a flow rate signal which is detected from an electrode of a pipe in accordance to the exciting current, based on a ratio of the flow rate signal to an exciting current signal which is detected from a third detection resistor connected in series to the exciting coil.

18. In an electromagnetic flow meter comprising: a first switching element in which a power source is connected to one end; a second switching element in which the power source is connected to one end; a third switching element in which another end of the first switching element is connected to one end of said third switching element, and a circuit reference voltage of said electromagnetic flow meter is connected to another end of said third switching element; a fourth switching element in which another end of the second switching element is connected to one end, and the circuit reference voltage is connected to another end; and an exciting coil in which a junction of the another end of the first switching element and the one end of the third switching element is connected to one end, and a junction of the another end of the second switching element and the one end of the fourth switching element is connected to another end of the exciting coil, the electromagnetic flow meter of a switching control system in which a direction of an exciting current flowing through the exciting coil is switched over by a fundamental excitation frequency, and the first switching element and the second switching element are controlled so as to hold the exciting current constant, the electromagnetic flow meter further comprising:
- a first detection resistor which is formed between the other end of the third switching element and the circuit reference voltage, and detects the exciting current; and
- a second detection resistor which is formed between the other end of the fourth switching element and the circuit reference voltage, and detects the exciting current.

19. The electromagnetic flow meter according to claim 18,
- wherein the first switching element is ON/OFF-controlled based on a reference voltage generated in the second detection resistor, and
- the second switching element is ON/OFF-controlled based on a reference voltage generated in the second detection resistor.

20. The electromagnetic flow meter according to claim 19, further comprising:
- a switch which selects the reference voltage of the second detection resistor when the second switching element is OFF and the fourth switching element is ON, and selects the reference voltage of the first detection resistor when the first switching element is OFF and the third switching element is ON.

21. The electromagnetic flow meter according to claim 18,
- wherein the second and third switching elements are turned ON after the first and fourth switching elements are turned OFF, and the first and fourth switching elements are turned ON after the second and third switching elements are turned OFF.

22. The electromagnetic flow meter according to claim 18, further comprising:
- a normalizing section which normalizes a flow rate signal which is detected from an electrode of a pipe in accordance to the exciting current, based on a ratio of the flow rate signal to an exciting current signal which is detected from a third detection resistor connected in series to the exciting coil.

* * * * *